United States Patent [19]

Forslund

[11] Patent Number: 4,665,961
[45] Date of Patent: May 19, 1987

[54] MACHINE FOR LIMBING TREES ARRANGED IN BUNDLES, ESPECIALLY SMALL TREES

[75] Inventor: Torsten Forslund, Alfta, Sweden

[73] Assignee: Osa AB, Sweden

[21] Appl. No.: 819,051

[22] Filed: Jan. 15, 1986

[30] Foreign Application Priority Data

Feb. 6, 1985 [SE] Sweden .................................. 8500542

[51] Int. Cl.⁴ ............................................. A01G 23/02
[52] U.S. Cl. ..................................... 144/2 Z; 144/343
[58] Field of Search ................ 144/3 D, 2 Z, 340, 343

[56] References Cited

U.S. PATENT DOCUMENTS

| 3,385,331 | 5/1968 | Bronemo et al. | 144/2 Z |
| 3,624,756 | 11/1971 | Mellgren | 144/2 Z |
| 3,690,352 | 9/1972 | Herolf | 144/2 Z |
| 4,574,854 | 3/1986 | Lindbloom et al. | 144/2 Z |

Primary Examiner—W. D. Bray
Attorney, Agent, or Firm—Larson & Taylor

[57] ABSTRACT

A machine for limbing trees arranged in bundles including two alternatingly cooperating carriers (8, 9), at least one carrier (8) including a number of rotatable, suitably cylindrical, limbing means (10), means being associated to the carriers to transfer the separate bundle of trees from one carrier to another and vice versa, thus loosening the bundle in order to revolve the trees and successively bring unlimbered parts of the trees into contact with said limbing means (10).

21 Claims, 8 Drawing Figures

MACHINE FOR LIMBING TREES ARRANGED IN BUNDLES, ESPECIALLY SMALL TREES

TECHNICAL FIELD OF THE INVENTION

This invention relates to a limbing machine including a swingable carrier alternatingly cooperating with a number of rotatable, suitably cylindrical limbing means, said carrier being, at its side or end facing the limbing means, articulatedly joined to an underlying frame by means of joints and being swingable by means of one or more power actuators, e.g. hydraulic jacks, between a position downwardly inclined from said joints and a position upwardly inclined from said joints.

PRIOR ART

Whole, unlimbed trees taken out of a forest in connection with thinning are small and have a relatively small volume of wood. In order to obtain a rational and economic handling in relation to the obtained amount of wood it is essential that each tree does not have to be limbed separately. For this reason it has been tried in the forest industry to limber trees arranged in bundles; this has been done not only with centrally placed machine but also with mobile machines. The previously known devices developed for this purpose have however not worked satisfactorily and in particular there have been difficulties to obtain a satisfactory limbing combined with an acceptable capacity, of all the trees in a bundle, the trees in a bundle normally being tied together effectively by the twigs to an entwined unit. Particularly the stems situated in the center of the bundle are difficult to reach with the limbing tools in question within an economically reasonable time. If the bundle also contains birch trees particularly serious problems arise since the twigs of the birch trees are flexible and can be bent almost parallel to the stem so that the conventional limbing tools cannot cut the twigs close to the stem. The twigs thus will remain as troublesome appendages after the limbing. Other broadleaved trees than birch can have this kind of twigs as well.

A limbing machine in accordance with the above described technical field of the invention is disclosed in Swedish patent specification No. 338423. The limbing machine includes a swingable wall cooperating with fixed, rotatable limbing devices and together with a fixed wall defining a limbing space. The limbing tools form the bottom of this space. This wall can be swung down to open the limbing space and thus allow the space to be filled with or emptied from trees. When the limbing operation is to start the wall is swung into an essentially vertical position thereby closing the limbing space and is subsequently given a limited swinging movement close to this vertical position. The bundle of trees that are to be limbered are situated on top of the limbing tools and confined thereon by both the fixed and the swingable wall. If the bundle of trees are tied together to an entwined unit, which normally is the case, the bundle may either rotate as an unit on the limbing tools along its longitudinal axis if the tools rotate in the same direction or remain stationary on the tools if these rotate in different directions. The swinging movement of the wall is not sufficient to loosen the bundle which only will be pushed backwards and forwards. Consequently, in both cases the trees in the bundle, particularly the trees situated in the center of the bundle, will not be completely limbered.

Further examples of machines for limbing trees in bundles are disclosed in for instance U.S. patent specifications 2125529 and 4295507, Swedish patent specification Nos. 88678, 158984 and 323795 and Swedish patent application No. 7701739-0.

BRIEF DESCRIPTION OF THE INVENTION

The present invention aims to eliminate the above-mentioned difficulties and to create a machine that in a short time effectively can limb trees arranged in bundles and at the same time be given small dimensions so that it can be used as a mobile unit in the forest-stands as well as placed centrally. In accordance with the invention these and other aims are obtained by the fact that the limbing means are arranged on a second carrier being, in the area of its side or end facing the first carrier, articulatedly joined to an underlying framework by means of second joints and being swingable by means of one or more power actuators, e.g. hydraulic jacks, between a position downwardly inclined from said second joints wherein a bundle of trees can be received on and remain on the carrier for treatment by said limbing means, and a position upwardly inclined from said second joints wherein the separate bundle of trees will fall down from the second carrier on to the first carrier which is in its lower position, whereby the bundle can be transferred from one carrier to the other and vice versa, thereby loosening the bundle in order to revolve the trees and bring their unlimbered parts into contact with said limbing means.

BRIEF DESCRIPTION OF THE ATTACHED DRAWINGS

In the drawings

Figure 1:
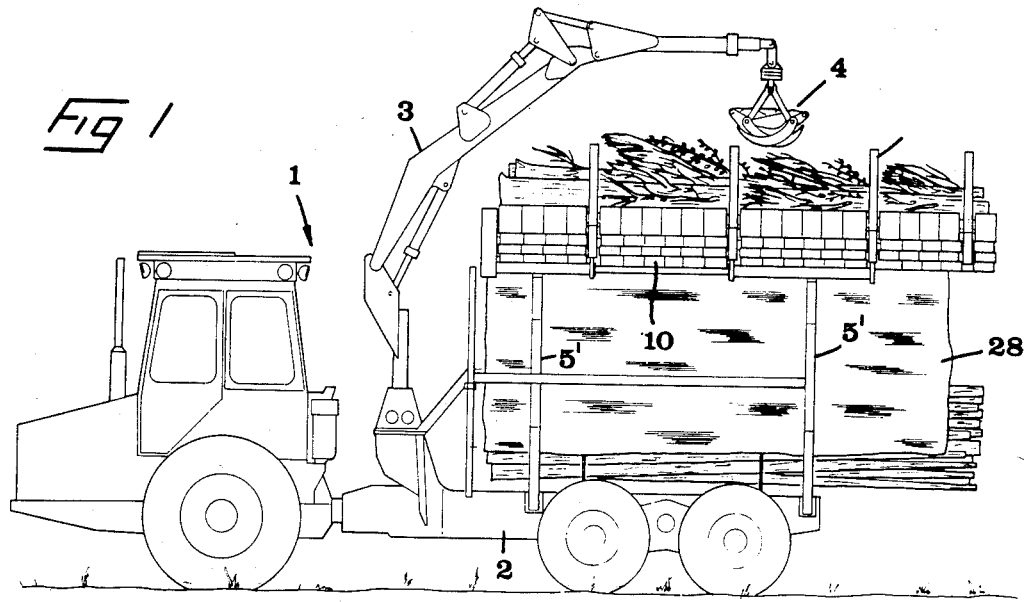
FIG. 1 is a side view of a machine according to the invention in operation.
Figure 2:
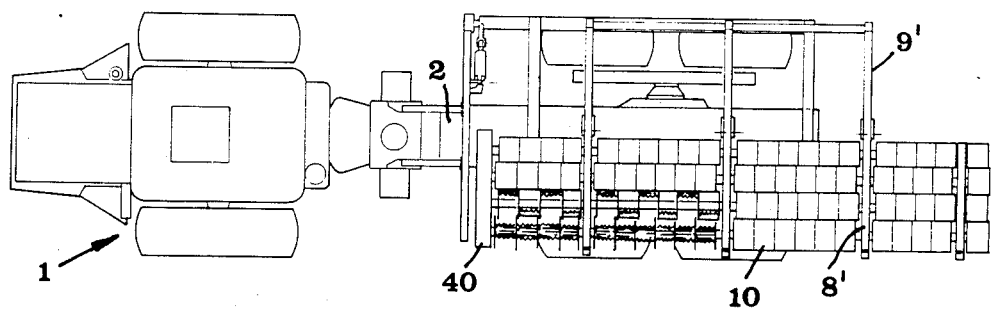
FIG. 2 is an overhead view of this machine.
Figure 3:
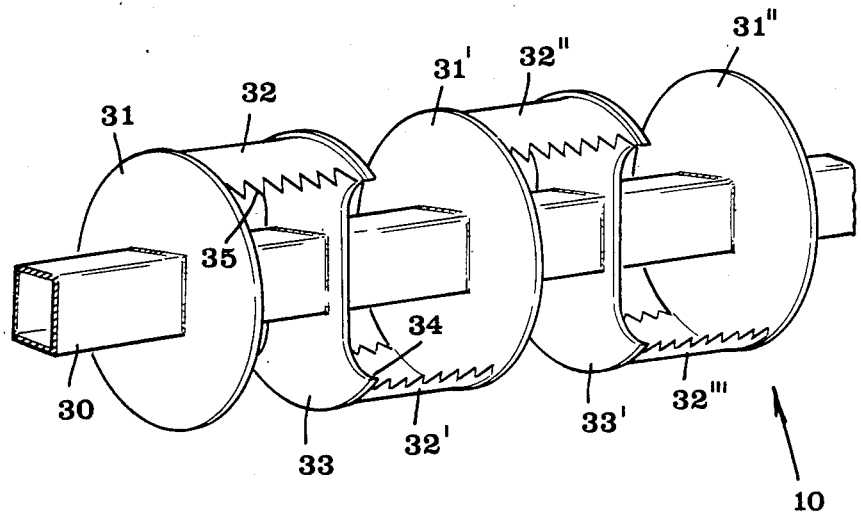
Figure 4:
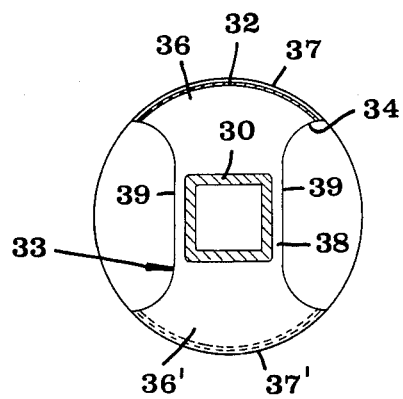
Figure 5:
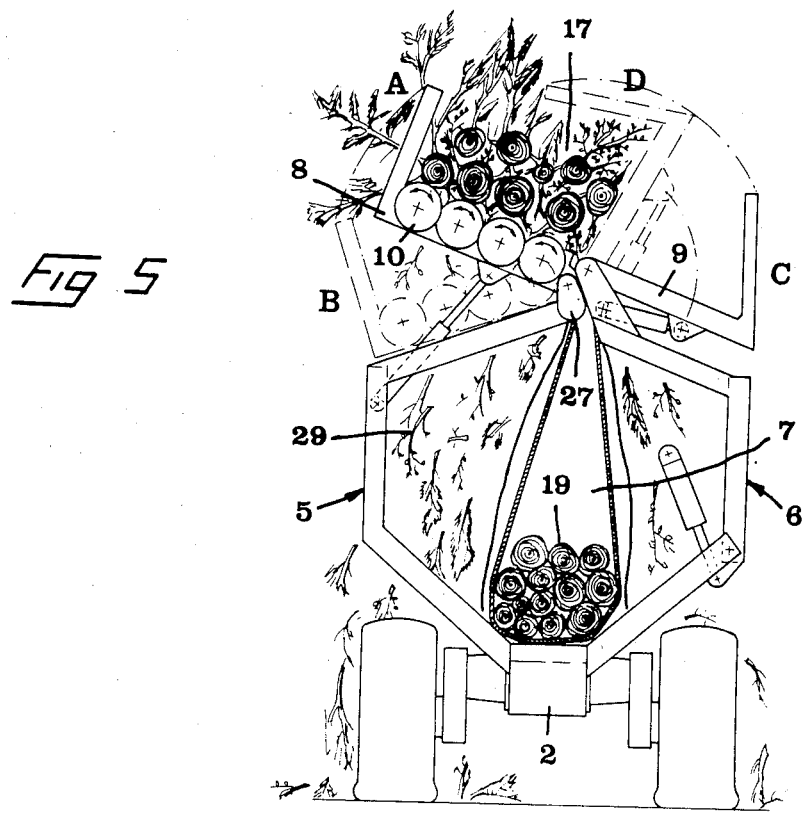
Figure 6:
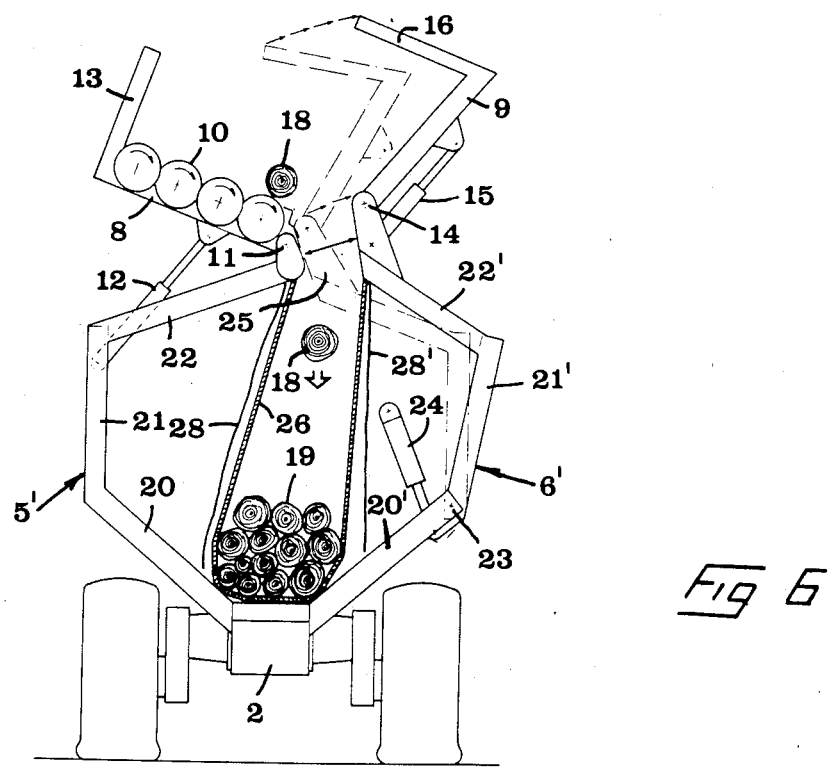
Figure 7:
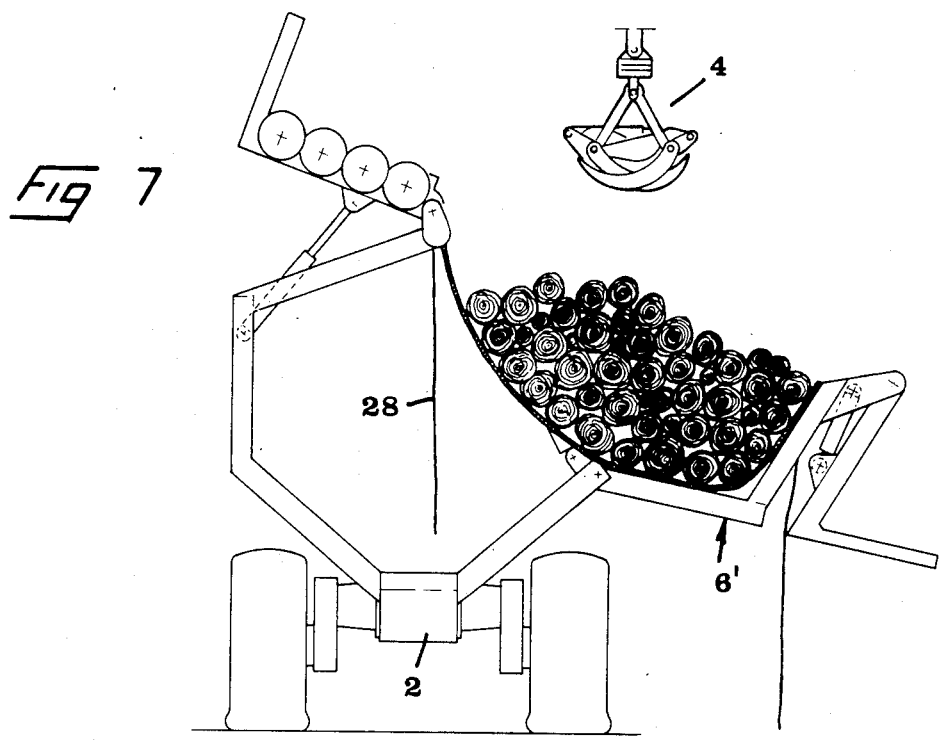
Figure 8:
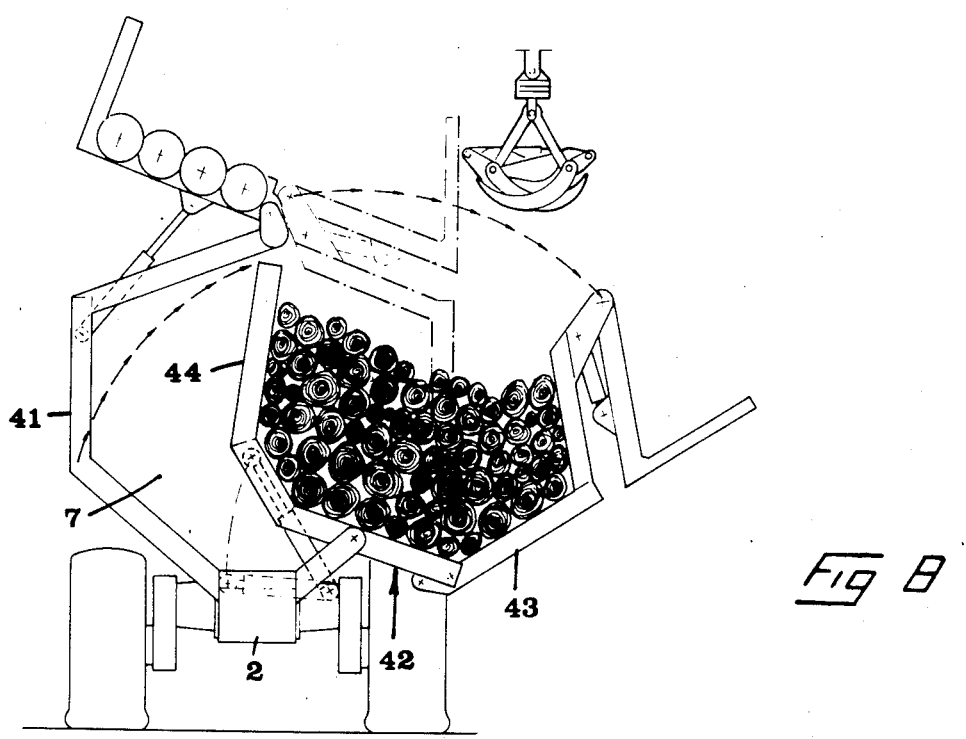

FIG. 3 is a partly sectioned perspective view of a limbing means included in the machine, FIG. 4 is a cross section of the limbing means shown in FIG. 3, FIG. 5 in an enlarged end view of the machine of FIGS. 1 and 2 during a first stage of operation, FIGS. 6 and 7 are similar end views illustrating the machine during two other stages of operation and FIG. 8 an end view showing an alternative embodiment of the machine according to the invention.

DETAILED DESCRIPTION OF PREFERRED EMBODIMENT OF THE INVENTION

In FIGS. 1 and 2 1 generally refers to a basic cross-country vehicle in the form of a wheeled forwarder including a chassis in the form of a beam or frame 2. A crane construction 3, carrying a grapple 4 having a sawing function or alternatively a felling tool, is arranged on the vehicle.

As further can be seen in FIGS. 1 and 2 in combination with FIGS. 5-7, the chassis 2 carries two laterally separated frameworks 5,6 together confining a loading or storage space designated 7. In accordance with the principle of the invention two alternatingly co-operating carriers 8,9 are arranged on these frameworks 5,6, the carrier 8 including a number of rotatable, in this case cylindrical, limbing means 10. The first carrier 8 or bridge is in the area of the side facing the second carrier 9 connected to the underlying framework 5 by articulated joints 11 that allow swinging of the bridge. In practice the carrier is swung by one or more hydraulic jacks or power actuators 12. A number of projecting posts or limiting members 13 are arranged on the side of the carrier 8 opposite to the joints 11. As can be seen in FIG. 5 the carrier 8 can be swung from the position A (shown in a continuous line), in which the carrier is inclined outwards-upwards from the joints 11, to the position B (shown in a dash and dot line), in which the bridge is inclined downwards from the joints. The other carrier 9 or bridge is connected to the underlying framework 6 by articulated joints 14 and swingable by a number of hydraulic jacks, more precisely from the position C shown in a continuous line to the position D shown in a dash and dot line. The carrier 9 also includes a suitable number of limiting posts 16. While the limiting posts 13 extend essentially perpendicularly to their associated carrier the posts 16 are directed at an acute angle to the carrier 9, for instance at 60°–80° thereto.

In FIGS. 5 and 6, 17 generally designates a bundle of unlimbered trees about to be treated. The individual tree is designated 18 whilst the treated logs received in the loading space 7 are collected in a stack designated 19.

As can be seen in FIGS. 1 and 2 the two carriers are composed of a plurality of mutually separated, crosswise arranged beams or arms 8' and 9' respectively. In the embodiment shown the carrier 8 thus includes four such supporting arms 8' whilst the other carrier 9 includes three supporting arms 9'.

In practice each of the two frameworks 5,6 consists of a plurality of mutually separated essentially C-shaped bars 5,6, each including a lower part 20,20' inclined outwards-upwards from the frame of the chassis 2, an intermediate part 21,21' projecting suitably vertically upwards from said lower part and an upper part 22,22' projecting inwards-upwards from said intermediate part. In the framework 5 the parts 20,21,22 of the bars are all rigidly interconnected. In the other framework 6, however, the intermediate part 21' is articulatedly joined, namely by a joint 23, to the lower part 20' rigidly joined to the chassis frame 2.

The intermediate part is at its upper end rigidly connected to the upper part 22'. The intermediate part 21 is swingable in relation to the lower part 20' by means of a hydraulic jack 24. By the fact that the intermediate parts 21' and the lower parts 20' of the bars are articulatedly joined, the upper parts 22' can be swung outwards from the corresponding upper parts 22 in the rigid framework 5 whilst forming an opening 25 through which the logs 18 can fall down after having been treated by the limbing means 10.

In order to avoid that the limbered logs fall down into the loading space 7 in an uncontrolled way, a number of wires 26 are arranged with the purpose to catch the falling logs. Each such wire 26 extends from a fixed attachment point in the upper part 22' of a bar 6' to a winding device 27 arranged at the upper part 22 of the opposite bar 5'. By means of this winding device 27 the length of the wire can be varied in a controllable way. The sling formed by the wire thus can be held relatively narrow when the loading space is empty and be successively enlarged at the rate of increase of the amount of limbered logs in the loading space. A curtain 28,28' is suspended from the upper part of each of the two frames, that confine the storage space 7 with the purpose to prevent that twig fragments 29 falling down from the bridges 8,9 are mixed with the stack of treated logs 19 already contained in the loading space 7. It is particularly important to avoid such mixing of twig fragments into the load of limbered logs when the vehicle is to be used on a public road since twigs falling down on the road may form serious traffic hazards.

Reference is now made to FIGS. 3 and 4 which in an enlarged scale illustrate the features of an individual limbing means 10 incorporated in the machine. As can be seen in these Figs; the individual limbing means 10 includes an elongated shaft 30 which advantageously can be formed by an in section square-shaped tube. A plurality of mutually separated, suitably evenly distributed discs 31,31',31" are arranged on this shaft. Axially directed limbering tools 32,32',32",32'" situated at a distance from the shaft 30 extend between said discs. Intermediate discs 33,33' provided with hooks or hook-like parts are arranged between adjacent discs, the purpose of said hooks being to catch those twigs, particularly birch twigs, that in the bundle of trees tend to bend inwards towards their respective stems. In the embodiment shown each separate limbing tool 32 is formed by an in section archshaped plate that along its opposite longitudinal edges displays preferably sharp or cutting-edge sharpened sawtooth-formed projections 35. As best can be seen in FIG. 4. each separate intermediate disc 33 displays two diametrically opposed curved parts 36,36' whose circumferential curved edges 37,37' mainly have the same diameter as the discs 31. These curved parts 36,36' are connected by a comparatively narrow stem part 38 having straight edges 39 recessed in relation to the circumferential curved edges. By the recession of the edges 39 of the stem part 38 the hooks or hook-shaped parts by the means of which inwardly bent twigs can be caught and pinched off thus are formed in the transition between the circumferential edges of the curved parts and the edges 39 of the stem part 38. It should be noted that only one limbing plate 32 extends between each disc and the adjacent intermediate discs 33. It should further be observed that of two limbing plates joined to the same intermediate disc one plate is joined to a first curved part and the other plate is joined to the diametrically opposed curved part of said intermediate disc. In other words, the limbing tools are located diametrically opposed in a zig-zagformed or step-formed design. In accordance with an important feature of the invention the individual limbing plates or limbing tools 32 are located at some distance within the periphery of the discs and the intermediate discs respectively. By these means it is avoided that the limbing tools come into contact with the stems of the trees since the stems only come into contact with the discs and the intermediate discs respectively. In practice the limbing plates can be located 3–10 mm, suitably 5–7 mm, within the periphery of the discs.

The shafts 30 of the cylindrical limbing means 10 are rotatably journalled in the supporting arms or beams 8' that together form the carrier 8 (see FIG. 2). The shafts are driven by means of a driving device 40 that allows the rotation of the shafts to be reversed. Suitably the shafts can be driven individually so that one or more shafts can be driven in one rotational direction whilst one or more shafts simultaneously can be driven in the opposite rotational direction. It is also indicated in FIG. 2 how adjacent limbing means are slightly displaced in an axial and a radial direction in relation to each other so that the peripheries of the discs will overlap, for instance a few millimetres. In practice the driving device 40 will be designed to allow the rotational speed of the shafts 30 to be varied continuously for adaptation to varying twig dimensions, temperatures and sap conditions. The fact that the shafts are journalled in the supporting arms 8' prevents deflection of the shafts at high limbing resistances.

THE FUNCTION AND ADVANTAGES OF THE MACHINE ACCORDING TO THE INVENTION

When the machine is used in a forest the initial position is that the felled, unlimbered trees have been collected in stacks with the butt ends of the trees oriented towards the strip roads that run through the forest. The vehicle 1 is moved along a strip road and is stopped just in front of a bundle of trees. By means of the grapple 4 which has a sawing function, the operator grips this bundle and cuts the bundle at a suitable distance from the butt ends so that the logs that are to be taken care of are given an appropriate length. In the same grip the bundle of trees is then lifted and placed on the limbing device formed by the units 8,9,10. When the bundle 17 is received, the bridge 8 is suitably in the position B. The first stage of the limbing operation consists in that the cylinders 10 are brought into rotation, the twigs being removed by alternating the rotational direction of the cylinders and by alternatingly swinging the carrier between the positions A and B. In practice this treatment can be carried out in many different ways, for instance, all cylinders can be brought into rotation anticlockwise in accordance with FIG. 5 or adjacent cylinders can be brought into rotation in opposite directions etc. After a treatment of some seconds the carrier 8 is brought into the position A at the same time as the cylinders 10 all are brought into rotation clockwise in accordance with FIG. 5, the bundle of trees thus being fed onto the carrier 9 which then has been brought to the position C. At the next stage the carrier 9 at a high speed is swung up to the position D causing the bundle of trees to be thrown back onto the carrier 8. During this throwing operation the bundle of trees will be separated as well as turned so that the unlimbered sides of the individual stems will come into contact with the cylindrical limbing means 10. The sawtooth-formed limbing tools 32 will remove the greatest part of the twigs of conifers while the hooks 34 on the intermediate discs 33 will catch and remove the twigs of birches difficult to reach—these twigs often being close to and mostly parallel to the stem of the birch tree. This is also relevant for the twigs on certain other broad-leaved trees.

After a number of treatment cycles during each of which the bundle is first treated by the cylindrical limbing means 10, transferred to the carrier 9 and then thrown back onto the carrier 8, the bundle thus being successively loosened, the stems are free from twigs. At this stage the framework 6 is swung outwards from the position shown in FIG. 5 to the position shown in FIG. 6 thus forming the opening 25. Furthermore the carrier 8 is swung into its uppermost position A at the same time as the cylindrical limbing means 10 are brought into rotation clockwise in accordance with FIG. 6, the separate logs 18 thus being transferred down through the opening 25 and finally being received in the loading space 7, more precisely in the wire slings 26 between the two protective curtains 28,28'.

When the loading space 7 has been filled to its maximum, the limbered logs are transported to the storage area in question. At the discharge the bars 6' are swung from the position shown in FIG. 5 to that shown in FIG. 7, whereupon the discharge can be carried out by means of the grapple 4.

By means of the machine according to the invention bundle limbing can be carried out in an extremely short period of time whilst obtaining an efficient limbing of the stems independently of the kind of trees.

FIG. 8 shows an alternative embodiment in which the machine, apart from a first in section essentially C-formed framework 41 confining one side of the loading space in question 7 and rigidly connected to the frame 2, also includes a second, essentially U-formed framework 42 displaying a first shank or shankformed part 43, confining the opposite side of the loading space, and a second shank 44, the spatial position of which essentially coincides with the spatial position of the first framework 41 at the stage when the loading space is being filled with trees, the U-formed framework in its entirety being tiltable relative the frame at the discharging of the said space as shown in FIG. 8.

POSSIBLE MODIFICATIONS OF THE INVENTION

The invention is of course not restricted to the embodiments described and shown in the drawings. The essence is that the bundle of trees alternatingly can be transferred from one carrier to the other, thus successively loosening the bundle and exposing the unlimbered parts of the stems. It is also possible to provide both carriers with limbing means. Furthermore the design of the individual limbing tool can be varied at will, although in practice the limbing tools exemplified in the drawings are preferred. It should further be observed that the machine in accordance with the invention can be used in other ways than as a superstructure on a mobile unit in the form of a vehicle. Thus the device can be stationary or be applied on a mobile non-wheeled frame that by means of special vehicles can be moved between different sites. The combination basic vehicle- grapple loader-limbing device can be varied in different ways. The grapple loader can for instance be exchanged against another loading and discharging procedure and the basic vehicle can have an other character than that exemplified. Furthermore the loading space can be designed in various ways. The limbing operation can possibly entirely or partly be programmed and controlled automatically. The driving device for the limbing device can be an internal combustion engine, a hydraulic motor or an electric motor and the power transmission be carried out by means of toothed transmission gear, roller chains, V-belts or other means.

I claim:

1. In a machine for limbing trees, arranged in bundles including a plurality of limbing means for limbing the trees a first swingable carrier alternatingly cooperating with said limbing means, a first underlying framework, means, comprising first joints, for articulately joining said carrier, in an area thereof facing the limbing means, to said underlying first framework and means comprising at least one power actuator for swinging said first carrier between a first position downwardly inclined from said first joints and a second position upwardly inclined from said first joints, said machine further comprising a second carrier on which said limbing means are arranged, a second underlying framework, means, comprising second joints, for articulatedly joining said second carrier, in an area of thereof facing the first carrier, to said underlying second framework and means comprising at least one power actuator for, swinging said second carrier to a first position downwardly inclined from said second joints in which a bundle of trees can be received by and remain on second carrier for treatment by said limbing means, and for, when said first carrier is in the first, downwardly inclined position thereof, swinging said second carrier to a second position upwardly inclined from said second joints wherein a separate bundle of trees received in the second carrier will fall down from the second carrier onto the first carrier and be transferred thereto when the latter is in the first position thereof, said means for swinging said first carrier comprising at least one power actuator for swinging said first carrier to the second, upwardly inclined position thereof when said first carrier has a bundle of trees transferred thereto from the second carrier so as to transfer the bundle back to the second carrier, whereby the bundle can be transferred from one carrier to the other and vice versa, thereby loosening the bundle in order to rotate the trees and bring the parts thereof which have not been limbed into contact with said limbing means.

2. Machine according to claim 1, wherein the carrier includes limiting members on their sides opposite to the joints.

3. Machine according to claim 1, further comprising means defining a loading space between the carriers and means for separating the two carriers so as to provide an opening therebetween through which the trees can fall down into the loading space after the limbing operation has been accomplished.

4. Machine according to claim 3, wherein said means for defining a loading space comprisies first and second underlying frameworks, said frameworks being supported in spaced relationship and at least one of said frameworks comprising first and second parts which are swingably movable from a first position, close to the other framework, in which the two carriers are located next to each other, and a second position spaced at least some distance from the other framework wherein the carriers also are spaced at a distance from each other so as to form said opening.

5. Machine according to claim 4, wherein said machine includes a central frame and wherein each framework includes a plurality of spaced substantially C-shaped bars comprising lower parts inclined upwards from said central frame, intermediate parts projecting substantially vertically from said lower parts, and upper parts projecting inwardly and upwardly from said intermediate parts.

6. Machine according to claim 4 wherein said machine further comprises a central frame and at least one of the frameworks comprises a lower part rigidly connected to said frame an intermediate part articulatedly connected to said lower part, an upper part rigidly connected to said intermediate part and means, comprising a power actuator, for providing swinging of said intermediate part in relation to said lower part.

7. Machine according to claim 2, wherein the limiting members associated with the second carrier extend substantially perpendicularly to said second carrier and the limited members associated with the first carrier extend at an acute angle thereto.

8. Machine according to claim 4, further comprising at least one flexible member extending between the upper parts of the two frameworks which acts as a suspended sling in which falling limbed trees can be collected when said carriers are separated to provide said opening, means for controllably varying the length of said member.

9. Machine according to claim 4, further comprising a curtain suspended from the upper parts of each of said frameworks for preventing twig fragments falling down from the carriers from mixing with the limbed trees in the loading space.

10. Machine according to claim 1 wherein said limbing means includes an elongated shaft, a plurality of spaced, evenly distributed discs arranged along said shaft, and a plurality axially oriented limbing tools spaced from the shaft and extending between said discs.

11. Machine according to claim 10, wherein each limbing tool comprises a plate which is arch shaped in section.

12. Machine according to claim 11, wherein said the limbing plate include at least one saw tooth cutting edge.

13. Machine according to claim 10, wherein an intermediate disc is arranged on the shaft between two adjacent discs and comprises at least one hookshaped part arranged to catch those twigs in the bundle that tend to bent inwardly towards their associated stem.

14. Machine according to claim 13, wherein said intermediate disc includes two diametrically opposed curved parts whose circumferential curved edges have substantially the same diameter as the discs and a comparatively narrow stem part interconnecting said curved parts and including recessed edges in relation to the circumferential edges of the curved parts, said hookshaped parts being formed in the area of transition between the circumferential edges of the curved parts and the edges of the stem part.

15. Machine according to claim 13, wherein a single limbing tool and an intermiediate disc.

16. Machine according to claim 14, wherein two limbing tools are connected to the same intermediate disc, one of said tools being connected to a first curved part and the other of said tools being connected to the diametrically opposed curved part of said same intermediate disc.

17. Machine according to claim 10, wherein each limbing tool is spaced inwardly from the periphery of the discs in order to prevent the tools from coming into contact with the stems of the trees.

18. Machine according to claim 1, further comprising means for reversibly driving the limbing tools.

19. Machine according to claim 1, further comprising means for varying the rotational speed of the limbing means so as to adapt to varying twig dimensions, temperatures and sap conditions.

20. Machine according to claim 10, further comprising a plurality of supporting beams on which said limbing tools are journalled in order to prevent deflection of the tools at high limbing resistances, 21. Machine according to claim 1, further comprising a central frame, rigidly connected first, a substantially C-shaped framework connected said central frame and defining one side of a loading space, substantially U-shaped framework having a first shank defining the opposite side of the loading space and a second shank whose spatial position substantially coincides with the spatial position of the first framework when the loading space is being filled with trees, and means for tilting the entire U-shaped framework relative to the frame during discharging of the trees.

* * * * *